United States Patent
Whitfield, Jr. et al.

(10) Patent No.: US 8,484,335 B2
(45) Date of Patent: Jul. 9, 2013

(54) METHODS, SYSTEMS, AND COMPUTER PRODUCTS FOR DOWNLOAD STATUS NOTIFICATION

(75) Inventors: Lloyd Thomas Whitfield, Jr., Atlanta, GA (US); James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 454 days.

(21) Appl. No.: 11/593,378

(22) Filed: Nov. 6, 2006

(65) Prior Publication Data

US 2008/0109823 A1    May 8, 2008

(51) Int. Cl.
    *G06F 15/173* (2006.01)

(52) U.S. Cl.
    USPC ........... 709/224; 709/210; 709/206; 709/229; 709/231; 709/239; 709/244; 710/2; 710/15; 710/18; 710/19; 715/733; 715/740; 715/737; 718/104; 719/329

(58) Field of Classification Search
    USPC ................................................. 709/318, 224
    See application file for complete search history.

(56) References Cited

U.S. PATENT DOCUMENTS

| | | | | |
|---|---|---|---|---|
| 5,937,064 A * | 8/1999 | Eick et al. | ................. | 1/1 |
| 5,987,517 A * | 11/1999 | Firth et al. | .................. | 709/230 |
| 6,272,537 B1 * | 8/2001 | Kekic et al. | .................. | 709/223 |
| 6,735,720 B1 * | 5/2004 | Dunn et al. | ................. | 714/43 |
| 6,763,395 B1 * | 7/2004 | Austin | ................. | 709/245 |
| 6,766,376 B2 * | 7/2004 | Price | ................. | 709/231 |
| 7,233,997 B1 * | 6/2007 | Leveridge et al. | ............. | 709/229 |
| 7,644,173 B1 * | 1/2010 | Zhang | ................. | 709/231 |
| 7,707,614 B2 * | 4/2010 | Krikorian et al. | ............... | 725/94 |
| 7,716,358 B2 * | 5/2010 | Price | ................. | 709/231 |
| 7,779,097 B2 * | 8/2010 | Lamkin et al. | ............... | 709/223 |
| 7,836,131 B2 * | 11/2010 | Tosey | ................. | 709/206 |
| 7,913,182 B2 * | 3/2011 | Bear et al. | ................. | 715/778 |
| 2001/0020243 A1 * | 9/2001 | Koppolu et al. | .............. | 707/513 |
| 2002/0082939 A1 * | 6/2002 | Clark et al. | ................. | 705/26 |
| 2002/0093923 A1 * | 7/2002 | Bouet | ................. | 370/328 |
| 2002/0112237 A1 * | 8/2002 | Kelts | ................. | 725/39 |
| 2002/0143973 A1 * | 10/2002 | Price | ................. | 709/231 |
| 2002/0194609 A1 * | 12/2002 | Tran | ................. | 725/95 |
| 2003/0051255 A1 * | 3/2003 | Bulman et al. | ............... | 725/135 |
| 2003/0081621 A1 * | 5/2003 | Godfrey et al. | ............... | 370/400 |
| 2003/0088633 A1 * | 5/2003 | Chiu et al. | .................. | 709/206 |
| 2003/0195974 A1 * | 10/2003 | Ronning et al. | .............. | 709/230 |
| 2003/0217109 A1 * | 11/2003 | Ordille et al. | ................. | 709/206 |
| 2003/0221014 A1 * | 11/2003 | Kosiba et al. | ................. | 709/231 |
| 2004/0019667 A1 * | 1/2004 | Slemmer et al. | .............. | 709/223 |
| 2004/0025186 A1 * | 2/2004 | Jennings et al. | ............... | 725/93 |
| 2004/0034870 A1 * | 2/2004 | O'Brien et al. | ................. | 725/88 |
| 2004/0054650 A1 * | 3/2004 | Chun | ................. | 707/1 |
| 2004/0085283 A1 * | 5/2004 | Wang | ................. | 345/100 |
| 2004/0199514 A1 * | 10/2004 | Rosenblatt et al. | ............. | 707/10 |

(Continued)

OTHER PUBLICATIONS

Piper et al., "Streaming-Media Knowledge Discovery", 2001.*

(Continued)

*Primary Examiner* — Ondrej Vostal
(74) *Attorney, Agent, or Firm* — Cantor Colburn LLP

(57) ABSTRACT

Methods, systems, and computer products for download notification including identifying content for download, requesting a download of the content to a device and requesting a notification related to the status of the download.

15 Claims, 4 Drawing Sheets

U.S. PATENT DOCUMENTS

| | | | | |
|---|---|---|---|---|
| 2004/0242322 | A1* | 12/2004 | Montagna et al. | 463/29 |
| 2004/0268400 | A1* | 12/2004 | Barde et al. | 725/94 |
| 2005/0010955 | A1* | 1/2005 | Elia et al. | 725/88 |
| 2005/0215238 | A1* | 9/2005 | Macaluso | 455/414.1 |
| 2005/0216377 | A1* | 9/2005 | Trauberg | 705/30 |
| 2005/0226193 | A1* | 10/2005 | Karhiniemi et al. | 370/338 |
| 2006/0025209 | A1* | 2/2006 | Walker et al. | 463/25 |
| 2006/0026288 | A1* | 2/2006 | Acharya et al. | 709/227 |
| 2006/0059223 | A1* | 3/2006 | Klemets et al. | 709/200 |
| 2006/0077453 | A1* | 4/2006 | Plewnia et al. | 358/1.15 |
| 2006/0095792 | A1* | 5/2006 | Hurtado et al. | 713/189 |
| 2006/0206912 | A1* | 9/2006 | Klarfeld et al. | 725/40 |
| 2006/0208074 | A1* | 9/2006 | Eglen et al. | 235/383 |
| 2006/0224761 | A1* | 10/2006 | Howarth et al. | 709/231 |
| 2006/0236325 | A1* | 10/2006 | Rao et al. | 719/315 |
| 2006/0253874 | A1* | 11/2006 | Stark et al. | 725/62 |
| 2006/0271562 | A1* | 11/2006 | Kato | 707/10 |
| 2006/0282495 | A1* | 12/2006 | Abbadessa et al. | 709/202 |
| 2006/0284981 | A1* | 12/2006 | Erol et al. | 348/207.1 |
| 2007/0011327 | A1* | 1/2007 | Volodarsky et al. | 709/226 |
| 2007/0016636 | A1* | 1/2007 | Boerries et al. | 709/200 |
| 2007/0099599 | A1* | 5/2007 | Smith et al. | 455/414.1 |
| 2007/0124393 | A1* | 5/2007 | Maes | 709/206 |
| 2007/0130498 | A1* | 6/2007 | Hannuksela et al. | 715/500.1 |
| 2007/0143490 | A1* | 6/2007 | Gallou et al. | 709/231 |
| 2007/0157112 | A1* | 7/2007 | Peters | 715/786 |
| 2007/0162582 | A1* | 7/2007 | Belali et al. | 709/223 |
| 2007/0168535 | A1* | 7/2007 | Ikonen et al. | 709/230 |
| 2007/0202922 | A1* | 8/2007 | Myllynen et al. | 455/566 |
| 2007/0288986 | A1* | 12/2007 | Candelore et al. | 725/132 |
| 2008/0062246 | A1* | 3/2008 | Woodworth et al. | 348/14.01 |
| 2008/0082553 | A1* | 4/2008 | Wei et al. | 707/100 |
| 2008/0181221 | A1* | 7/2008 | Kampmann et al. | 370/389 |
| 2008/0186849 | A1* | 8/2008 | Kampmann et al. | 370/232 |
| 2008/0229207 | A1* | 9/2008 | Kataoka | 715/730 |
| 2009/0298575 | A1* | 12/2009 | Hopkins et al. | 463/25 |
| 2010/0138765 | A1* | 6/2010 | Rainisto | 715/766 |

OTHER PUBLICATIONS

Chang et al., "An Evaluation of Transport Protocols in Peer-to-Peer Media Streaming", 2008.*
Kishore, "Optimal Link Utilization and Enhanced Quality of Service Using Dynamic Bandwidth Reservation for Pre-recorded Video", 2003.*
Okugawa et al., "A Home Network Service Environment for Wide-Area Communications", 2005.*
Balasubramaniam et al., "Vertical Handovers as Adaptation Methods in Pervasive Systems".*
Jonvik et al., "Building a Virtual Device on Personal Area Network".*
Silva Filho et al., "The Design of a Configurable, Extensible and Dynamic Notification Service", 2003.*

* cited by examiner

METHODS, SYSTEMS, AND COMPUTER PRODUCTS FOR DOWNLOAD STATUS NOTIFICATION

BACKGROUND

The present invention relates generally to programming services, and more particularly, to methods, systems, and computer products for notifying a user when a requested download session from a content provider has been complete.

In order for a user to utilize web content, the content must be downloaded from a network server to a content receiving/presenting device. The content receiving device generally presents the content to the user, or processes the content for some purpose. Originally, Internet content included text and static images, which were displayed by a browser program running on a personal computer or workstation. Information was often provided over a low speed dial-up connection.

As Internet uses have grown, the types of content have increased (e.g., audio and video), and the types of presentation devices have also increased (e.g., cell-phones, pocket PC, wireless PDA, iPOD®, etc.) In addition, a variety of Internet access networks at a variety of speeds are available, including digital subscriber line (DSL), cable, wireless local area networks (WLAN or Wi-Fi), Worldwide Interoperability for Microwave Access (WiMAX), General Packet Radio Service (GPRS), etc. The length of time required to transfer a complete item of content is proportional to the size and nature of the file, and inversely proportional to the speed of the data connection, and the processing power of the sending and receiving devices. Today's users expect content and broadband providers to provide content (video, audio, images, software updates) in a timely manner. However, as content grows more complex (e.g., HDTV), and networks more crowded, downloads to some devices may not be immediate. In some cases, a less expensive, lower-speed download may be an acceptable choice. Unless the user sits staring at the destination device, the user may not be aware when the content has been downloaded and is ready for use.

In some cases, the presentation device can begin to present the data being downloaded, after a short initial buffering period. But in other cases, the complete content must be downloaded before presentation or processing can start. In still other cases, the user may simply prefer to download the file for later use, in the way that a Netflix® user orders movies for later use, for example.

What is needed, therefore, is a way to notify a user when a download request is complete and that the requested content is now available for use.

BRIEF SUMMARY

Exemplary embodiments include a download notification method, including identifying content for download, requesting a download of the content to a device and requesting a notification related to the status of the download.

Additional exemplary embodiments a download notification system coupled to a network, including a presentation device for receiving a notification related to a content download and a download notification application residing on at least one of the network, the presentation device and a content services provider device, the download notification application having instructions to identify the presentation device, monitor the download and send a notification to the presentation device upon a download event.

Further exemplary embodiments include a computer program product for providing download notification services, the computer program product including instructions for implementing a method, including identifying a device for receiving downloaded content, identifying a presentation device for receiving a notification related to the downloaded content, determining a location from which notification is sent, communicating with a notification server to receive notification preferences related to the downloaded content, monitoring the downloading process of the downloaded content and sending a download notification to the presentation device in response to a download event on the device for receiving the downloaded content.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

Figure 1:
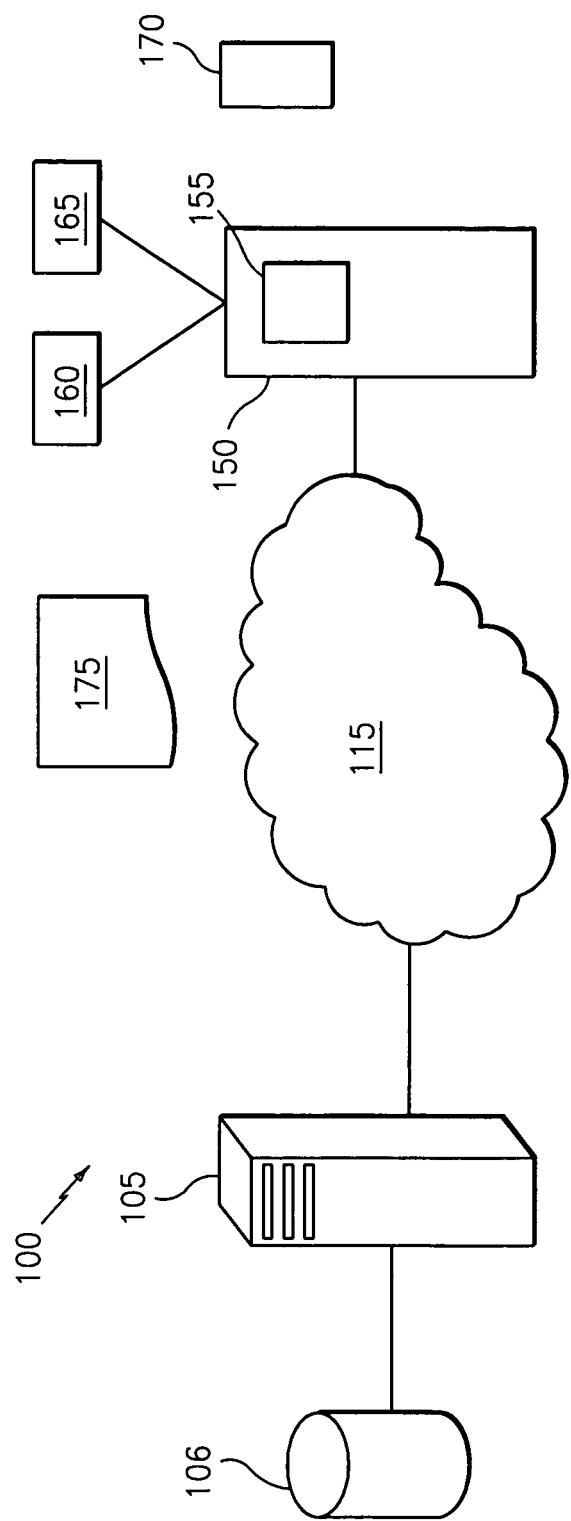
FIG. 1 is a block diagram illustrating a system in which download notification services may be implemented in accordance with exemplary embodiments.

The detailed description explains the exemplary embodiments, together with advantages and features, by way of example with reference to the drawings.

DETAILED DESCRIPTION OF EXEMPLARY EMBODIMENTS

In general, exemplary embodiments include methods and systems that notify a user who has requested a download session when a download session has stopped. Further, in accordance with exemplary embodiments, service for customer notification via email, SMPP or other alerts when a requested download session form a content provider has been successfully completed to any receiving device (e.g., cellphone, smart phone, PDA, laptop, desk top, etc.) are provided. A similar notification can be made if the download is unsuccessful. Exemplary embodiments apply to cases when a complete file must be downloaded in order to properly process or otherwise use, and the transfer time is greater than the user wants to wait for completion. Further exemplary embodiments include a method for detecting the initiation of a file transfer, waiting for termination of the file transfer, and notifying the user that the transfer has terminated. In one implementation, detection occurs at the server end. In another implementation, detection occurs at the client end. In another implementation, detection occurs in the transport network. Exemplary embodiments further include a system that notifies the user whenever the transfer of the content (e.g., a movie, album, song, ring-tone, etc.) has stopped. The stop may be normal completion, or it may be due to an error.

As discussed, the systems and methods described herein can notify a user when the transfer time is greater than the user wants to wait for completion. For example, for a large file such as a movie, a user can be notified via a notification application when the movie has downloaded. As such, the user can direct his attention to another task while the movie is downloading and be notified once the download is complete. In another example, if the user has a low-speed less-expensive transfer method for any type of file, the notification application can be implemented to alert the user. In another example, a network operator could provide a transport service that uses idle network capacity, and can, in one instance, implement "trickle charging," to deliver a file prior to a desired time of receipt. The term "trickle charging" refers to automated background downloading of content which is stored near the user, e.g. on the user's premises or a nearby network element, for later use. Content may be trickle-charged following an explicit request by a user, or may be "pushed" toward the user as a result of a network prediction that many users in an area may desire to view said content simultaneously. Trickle charging can be implemented to manage content distribution across networks with finite carrying capacity.

The term "file" is used to include one or more files used to compose a complete item of content, such as the video, audio, and closed-captioning files that make up a movie, etc. The nature of the file(s) being transferred may affect the transfer speed if compression schemes are in use—some files are more "compressible" than others.

FIG. 1 illustrates an embodiment of system 100 in which notification service to a user, when a requested download session from a content provider has been complete, is provided. System 100 generally includes content services provider 105 in communication with presentation device 150 via network 115. In exemplary implementation, a notification application 175 can be made available to the content service provider 105, the network 115, and the presentation device 150. Notification application 175 facilitates the notification service to a user when a requested download session from a content provider is complete.

In exemplary embodiments, content services provider 105 is implemented by a host system (e.g., a high-speed processing device) that provides content to its customers (e.g., a user of presentation device 150), such as television programs, premium programming services, video on demand content, and Internet/Web content (e.g., pod-casts, streaming media, etc.), ring-tones, audio files (e.g., songs, albums, etc.). System 100 can be used for applications that include large files that can take a long time to download. In exemplary embodiments, the provided content is transmitted to customers via a broadband connection over an Internet Protocol (IP)-based network (e.g., network 115). In other exemplary embodiments, system 100 can also be used for applications in which, even though the host system is capable of high-speed data transfer, the user implementing presentation device 150, is only capable of low-speed data transfer. System 100 can further include storage device 106 that is communicatively coupled to the content services provider 105 (e.g., via physical cabling or wireless means). Additionally, storage device 106 may be in communication with content services provider 105 via one or more networks (e.g., network 115). Storage device 106 may store programming content, as well as programming schedules for the content. In exemplary embodiments, storage device 106 stores records of programming events, and notification events, scheduled for transmission to customers, such as presentation device 150. Content from content services provider 105 can be from a variety of content sources (e.g., motion picture industry, television networks, Internet-based content providers, etc.)

Storage device 106 can be communicatively coupled to the content services provider 105 (e.g., via physical cabling or wireless means). Additionally, storage device 106 may be in communication with content services provider system 105 via one or more networks (e.g., network 115). In one implementation, storage device 106 can include a plurality of downloadable content and can be rendered on presentation device 150, which can be via set top box 160, discussed further in the description below. In other embodiments, content can include play lists that can include programming content, as well as programming schedules for the content (e.g., onscreen programming guide information). In exemplary embodiments, the storage device 120 stores records of programming events scheduled for transmission to customers, such as program receiving device 150. This transmission can be for immediate download or may be available at a future date, and as discussed further below, be provided via trickle charging. These records, in turn, include download information that is utilized by download notification application 175.

As discussed above, presentation device 150 can be any variety of devices that can be used to download, render and process content. In an exemplary implementation, presentation device 150 can be network-enabled and can include, but is not limited to: television (TV); Internet Protocol television (IPTV); cell-phone; smart-phone; PDA; wireless PDA; laptop; desktop; pocket PC; iPOD®, etc. Presentation device 150 may include display screen 155 for viewing or other rendering of content provided by the content services provider system 105 and selected by a user. As described, current program content refers to an application having a large file that can take a period of time to download for which a user is not willing to wait. Display screen 155 includes the ability to display multiple windows such that a user can view a desired window, such as a window playing a movie, and still be able to view a notification window or other notification indication such as an on-screen icon or audible indicator, which can be displayed upon the notification of a download status, as discussed further in the description below.

Program receiving device 150 can also include auxiliary devices, such as set top box 160, personal video recorder (PVR) 165, and device 170, which can be a remote control, cellular phone, PDA, etc. In other exemplary embodiments, described further below, device 170 can be another presentation device similar to presentation device 150. Set top box 165 provides a connection between the presentation device 150 and external sources of signals, converting the signals into content that is displayed on a screen of presentation device 150. Where presentation device 150 is receiving IPTV content, set top box 165 includes a computer that provides bi-directional communications between network 115 and presentation device 150 and decodes the video streaming media received as content programming and onscreen programming information from content services provider system 105. Device 170 can include options (e.g., interface) enabled by the notification for selecting an application that is capable of notifying the user that a download is complete. PVR 165 can be communicatively coupled to presentation device 150 and records programming as configured by a user of the presentation device 150. In exemplary embodiments, downloads can be coupled to presentation device 150 and PVR 165 such that a download can be trickle charged not only to presentation device 150 but also to PVR 165. As such, movies and other files and applications can be pre-provided to customers prior to a release date such that the file is available to the user on the release date. A download notification can then be sent to the user that the movie or file is now available for use. In another implementation, if the content services provider has trickle charged a file to a user in anticipation of a release date, but the file has completely downloaded prior to the release date, the content services provider can delay notification until the release date.

In accordance with exemplary embodiments, network 115 is an IP-based network that transmits programming content from content services provider system 105 to customers, such as program receiving device 150 via a data connection. Network 115 may be implemented in a wireless fashion, e.g., using wireless protocols and technologies, such as WiFi, WiMax, etc.

As mentioned above, system 100 further includes download notification application 175. Download notification application 175 is configured to monitor download progress and notify the user who requested a download of the download success or failure. Download notification application 175 and related download notification enabled services may be implemented as a single program executing on one of content services provider 105, network 115 and presentation device 150, or may be separate physical or logical components that interact via, e.g., an application programming interface or other technique. In general, download notification application 175 can reside in a number of locations within system 100 and uses existing network resources for the notification services. In exemplary embodiments, download notification application 175 can reside on content services provider system 105. In other exemplary embodiments, download notification application 175 can reside on network 115. In further exemplary embodiments, download notification application 175 can reside on presentation device. These exemplary embodiments and others are now described.

Figure 2:
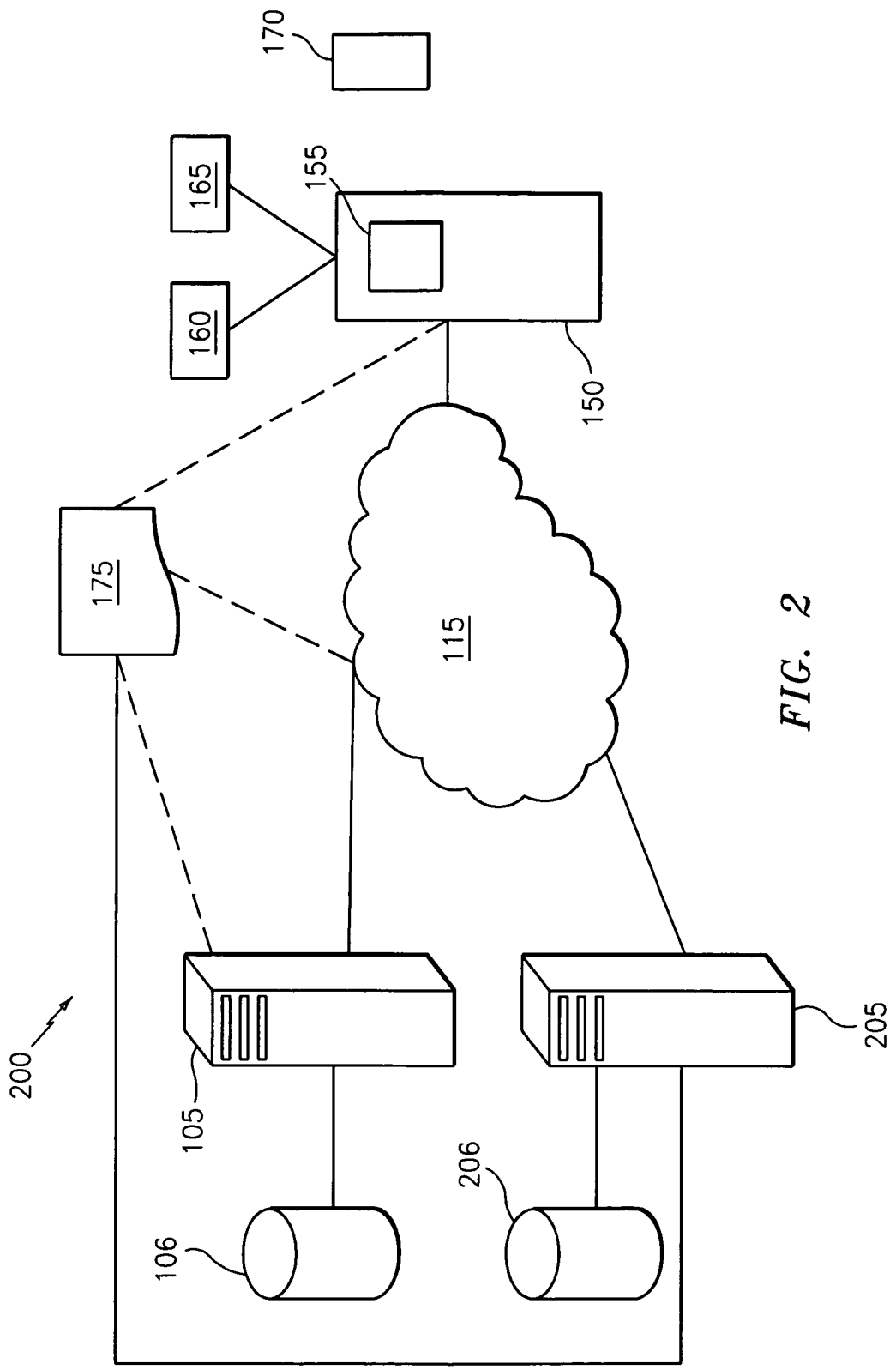
FIG. 2 is a block diagram illustrating a system in which download notification services may be implemented in accordance with exemplary embodiments.

FIG. 2 is a block diagram illustrating a system 200 in which download notification services may be implemented in accordance with exemplary embodiments. Similar to as described above, system 200 includes content services provider 105 in communication with presentation device 150 via network 115. Storage device 106 is coupled to content services provider 105. Notification application 175 facilitates the notification service to a user when a requested download session from a content provider is complete. The dashed lines connected between notification application 175 and each of content services provider 105, network 115, and presentation device 150 are illustrated to indicate that notification application 175 can reside on any of the aforementioned. Three exemplary locations in which notification application 175 can reside are discussed above, that is, content services provider 105, network 115 and presentation device 150. Regardless of the location of notification application 175, a user can utilize notification application 175 in conjunction with a download session to receive a notification of when the download has completed.

FIG. 2 further illustrates notification server 205 coupled to network 115 and in communication with notification application 175. System 200 can further include storage device 206 coupled to notification server 205. In an exemplary embodiment, storage device 206 can be a notification repository, which can be or previously has been populated with notification preferences and notification devices onto which a user, having access to notification server 205, has provided and desires to be notified upon a completion (download) event, as discussed further in the description below.

It is appreciated that content services provider 105 and content recipient, presentation device 150, are mutually aware of a file transfer transaction, since that have agreed on an acceptable transfer method. Often, the size of the transfer is communicated form the source of the file, that is, content services provider 1205, to the destination, that is, presentation device 150. Using this file size information, either end of the transaction can detect when a successful transfer has completed. In addition, the transport network, that is network 115, may be able to monitor the file transfer information exchanged between the source and the destination. Armed with this information, network 115 can also detect the end of a file transfer. Therefore, it is also appreciated that notification application can reside and be utilized by any of the three aforementioned locations.

It is appreciated that under certain circumstances, network 115 may not be able to monitor the details of the file transfer request (e.g., if the details are encrypted), but network 115 may still be able to determine that a file transfer is taking place by analyzing the source, destination, and traffic patterns of a series of packets. There may also be circumstances in which network 115 is completely unable to detect the beginning and the end of a file transfer.

In any of the cases described, and in other cases, if a transfer stops, whether at a successful conclusion, or due to a fault of some sort, the detecting system (e.g., content service provider 105, network 115, presentation device 150, etc.) can send a message to notification server 205 to alert the subscriber. If the status of the transfer is known (e.g., successful, stopped for unknown reason, etc.), the status can be included in the notification. For example, a notification message can be that the download is successful. In addition, in many circumstances a download may only be usable, such as a movie file protected by certain digital rights management systems, when the download is complete. Therefore a notification can first include a message that the entire file is required before use and then a download complete notification can be sent to the user upon complete file download. In another example, if a file can be viewable when a certain amount of the file has been buffered, a first notification message can alert the user that when a certain buffer is attained, the file is usable. Then when that buffer is reached, the user can further be notified that use (e.g., viewing) is now possible. In still other examples, if a download is unsuccessful, a user can be notified. Specific notification messages can be included such as the reason, including a lost connection with the content services provider, etc. The aforementioned download events and other notification information such as but not limited to: file size, transfer rate, transfer time, etc., are contemplated in various embodiments and implementations known in the art.

Therefore, in exemplary embodiments, detection can be accomplished in many locations via systems 100, 200. In an exemplary embodiment, a user can configure notification application 175 at the particular location for a given transaction or for a series of related transactions. For example, a user can configure his own IPTV for download notification preferences for a given movie download from a particular provider. Similarly, the user can configure the download notification preferences for that particular provider for every movie that is downloaded presently and in the future. In another exemplary embodiment, notification server 205 can be exploited and pre-populated with download notification preferences based on service plans, etc. Notification server 205 therefore maintains notification destinations and preferences for each associated user. Notification server 205 may be used to indicate multiple events on a variety of devices such as presentation device 150, based on the user's selected preferences, time of day, nature of notification, etc. For example, notification server 205 may be used to light a light on a landline telephone (which is this case is presentation device 150), and send an email to a pager (which in this case is an additional presentation device 170), to indicate a new voice mail. In another example, notification server 205 might activate a desktop client and place a phone call to indicate that a new urgent email message has arrived. In still another example, notification server 205 may send a short message service (SMS) message to a cell phone to indicate a download status.

Figures 3A, 3B:
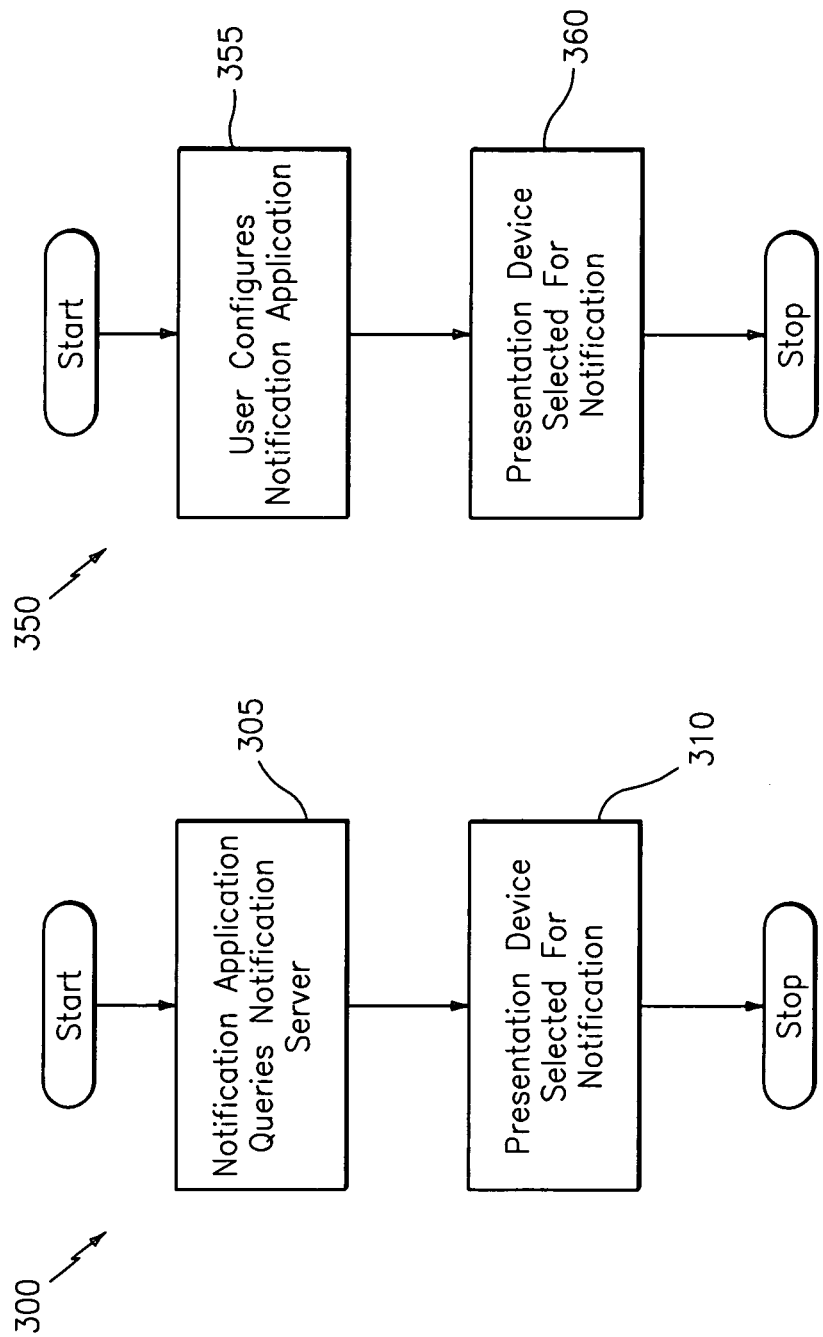
FIG. 3A is a flow diagram describing processes for implementing presentation device selection services in exemplary embodiments.
FIG. 3B is a flow diagram describing processes for implementing presentation device selection services in exemplary embodiments.

FIG. 3A is a flow diagram describing processes for implementing presentation device selection services in exemplary embodiments. Two exemplary methods 300, 350 are illustrated. It is appreciated that other methods are possible. In a first method 300, a notification server, such as notification server 205 has been pre-populated with notification preferences based on, for example, a service plan. Therefore, at step 305, when a user has requested a download notification service (see FIG. 4), the notification application 175, regardless of where it resides (e.g., the three aforementioned locations) queries the notification server 205. In response to this notification at step 305, the selected presentation device is selected for notification at step 310. In one implementation, a user can at times, change notification preferences via a presentation device or another device that is in communication with the user's service plan provider.

FIG. 3B is a flow diagram describing processes for implementing presentation device selection services in exemplary embodiments. In a second method 350, a user can on a per-transaction basis select the presentation device. For example, each time a user logs into a movie provider service, the user can select a presentation device for notification. Therefore, at step 355, the user configures the notification application 175 via the particular provider service. In response to this notification at step 355, the selected presentation device is selected for notification at step 360. In one implementation, a user can change notification preferences via a presentation device or another device that is in communication with the particular service provider or application.

It is appreciated that the choice of the presentation device for notification can be an on-going process, in which the user can periodically change the presentation device. It is also appreciated that the selected presentation device may not be the same device onto which the desired download is accomplished. For example, a user may use a cell phone as a remote control for his TV. Therefore, the cell phone is device 170 and the TV is presentation device 150. As such, the user may order a movie via either device 170 or presentation device 150 and in turn select either device 170 or presentation device 150 as the notification presentation device. Similarly, the user may be ordering a download for a child and does not have a concern about being notified about such a download. Therefore, a user can order a download via device 170 for download onto presentation device 150, in which case is a TV or IPTV, for example. Then the user can specify yet a third device as the notification presentation device. Using the same example, a user can further specify his device 170 as a notification device if the child is ordering a download via a third device. In this way, a user can specify that device 170 be a presentation device for a download. In a specific example, a user can specify to be notified when particular content is downloaded, such as an R-rated movie, a song with explicit lyrics or an entertainment software rating board (ESRB) M-rated game, etc. Therefore, it is appreciated that download notifications can take several forms and be spread out over several different devices.

Figure 4:
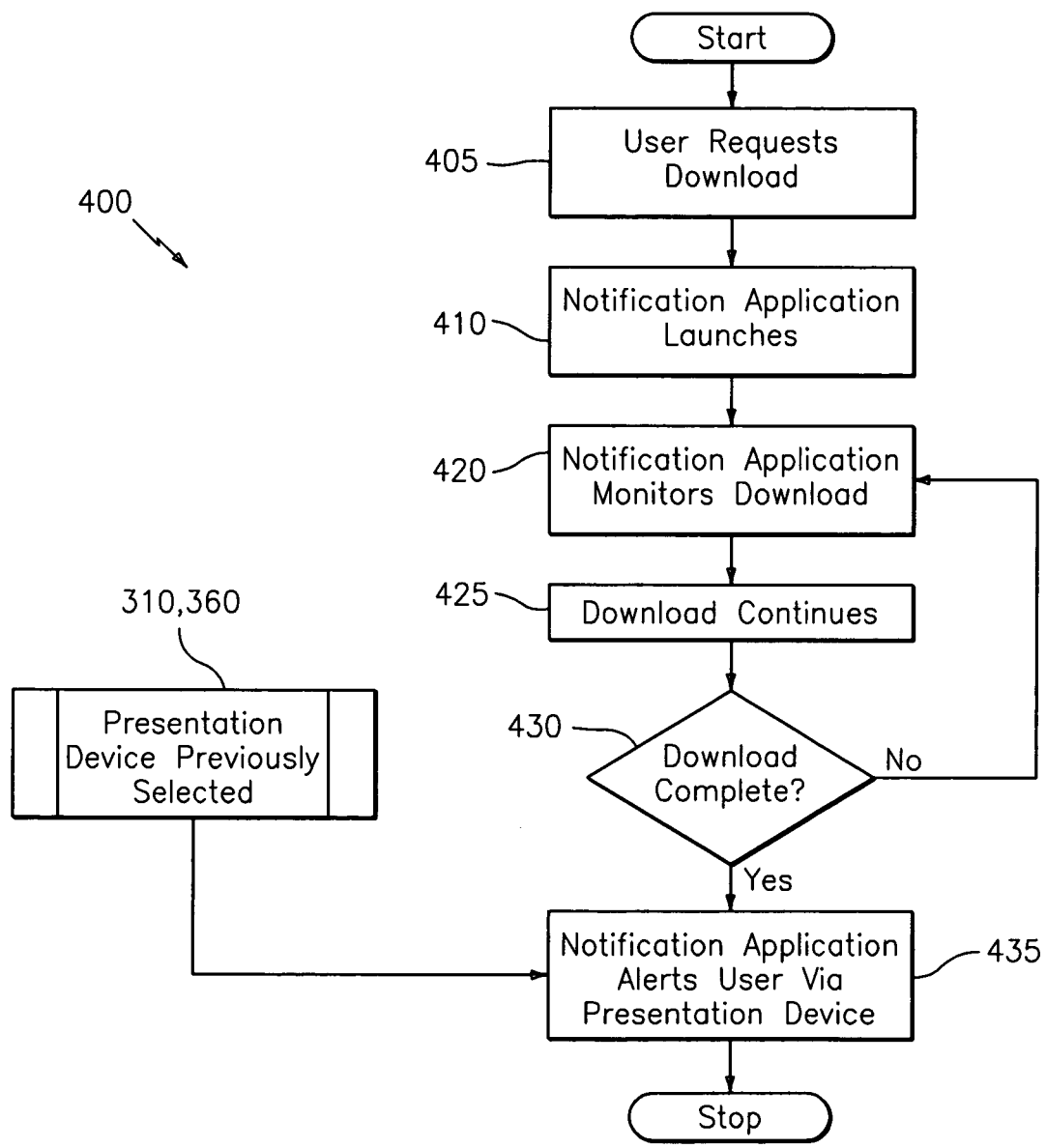
FIG. 4 is a flow diagram describing a process for implementing download notification services in exemplary embodiments.

FIG. 4 is a flow diagram describing a process 400 for implementing download notification services in exemplary embodiments. As discussed above, a user can request a download at step 405. In general, at step 410 a notification application 175 also launches. It is appreciated that regardless of the location of the notification application 175, the notification application 175 may have been previously launched or launches simultaneously with a download request as needed. At step 420, the notification application 175 monitors the download. As discussed above, the notification application 175 can send a first notification to alert the user of the type of download. For example, if the download is capable of viewing after a certain buffer is attained, then notification application 175 can first alert the user that the download will be viewable after a certain buffer. The download then continues at step 425. At step 430, if the download is not complete the notification application 175 continues to monitor the download at step 420. Generally, at this point the notification application 175 does not notify the user of any progress. However, in another implementation, the notification application 175 can be configurable to periodically notify the user as of the progress and can ask the user if the user desires to change any preferences at that point, or even cease the download. In another example, the user could also reconfigure notification application 175 to specify a new presentation device for notification or viewing.

Referring still to FIG. 4, at step 430 if the download is complete then the notification application alerts the user via the presentation device. As discussed earlier with respect to FIG. 3, the presentation device was previously selected at steps 310, 360. In general, the user receives the downloaded content, and at approximately the same time, receives the notification at step 435. In another implementation (not shown in the figure), the download at step 440 could be completed following a response from the user that he desires to complete the download after being previously notified of the download progress.

Referring again to FIG. 1, it is therefore appreciated that content services provider 105 includes a media server capable of providing files and applications to a specified device, such as presentation device 150 or device 170, or other contemplated device. For example, movie services can be provided to a TV via set top box 160 of all subscribers to the content services. Content services provider 105, network 115 and presentation device 150, are all capable of running notification application 175 and therefore, being the driving device for notification application 175. In general, the methods 300, 350, 400 monitor the user's activity to make on-going decisions whether or not downloads and related notifications are requested.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A download notification method, comprising:
    identifying a movie for download by a user device;
    requesting, by the user device, a download of the movie to the user device;
    configuring a notification application of the user device to provide a notification to a user related to a status of the download, wherein the notification application is operative to monitor the status of the download;
    before the download is complete, receiving at the user device an alert in a notification message for display to the user on a display of the user device, in which the notification message indicates that the download will be viewable on the user device when a certain buffer is attained prior to completion of the download; and
    during the download and while the notification application monitors the download, receiving an alert in another notification message for display on the display of the user device in a notification window, in which the another notification message asks on the display of the user device whether the user desires to change notification preferences at that point for notifying the user about the status of the download of the movie;
    the notification preferences being an identification of a notification device upon which the user desires to receive display of the status of the download of the movie including a progress of the download, successful conclusion, and stopped;
    wherein the notification device to receive display of the status of the download of the movie is initially the user device, and the user configures the notification application to change the display of the status of the download of the movie from the user device initially used to a new notification device.

2. The method as claimed in claim 1 further comprising receiving at the user device an alert in a different notification message for display to the user responsive to the certain buffer being attained but before the download is complete, in which the different notification message indicates that the download is now viewable;
    wherein the notification message, the another notification message, and the different notification message are via email.

3. The method as claimed in claim 1 wherein the notification message further comprises displaying to the user on the user device a successful download in an event of the successful download, displaying to the user on the user device transfer stopped due to a fault in an event the transfer stopped due to the fault, displaying to the user on the user device stopped for unknown reason when stopped for the unknown reason, and displaying to the user on the user device the certain buffer is attained such that the download is viewable in an event the certain buffer is attained.

4. The method as claimed in claim 2 wherein the notification is related to an unsuccessful download.

5. The method as claimed in claim 1 further comprising receiving the movie of the download.

6. The method as claimed in claim 1 further comprising receiving the notification that the download of the movie is successful.

7. The method as claimed in claim 1 further comprising requesting that the notification related to the status of the download is received in a presentation device.

8. The method as claimed in claim 7 wherein the user device receiving the download is the presentation device.

9. The method as claimed in claim 7 wherein the presentation device is coupled to the user device receiving the download.

10. The method as claimed in claim 1 further comprising receiving the notification from a notification server via a network.

11. A download notification system coupled to a network, comprising:
    a presentation device for receiving a notification related to a download of a movie; and
    a download notification application residing on the presentation device, the download notification application having instructions to:
    identify the presentation device;
    monitor the download of the movie to the presentation device;
    receive the notification to the presentation device upon a download event for the movie;
    before the download is complete, receive at the presentation device an alert in a notification message for display to a user on a display of the presentation device, in which the notification message indicates that the download will be viewable on the presentation device when a certain buffer is attained prior to completion of the download; and
    during the download of the movie and while the download notification application monitors the download of the movie, receive an alert in another notification message for display in a notification window on the display of the presentation device, in which the another notification message asks on the display of the presentation device whether the user desires to change notification preferences at that point for notifying the user about the status of the download of the movie;
    the notification preferences being an identification of a notification device upon which the user desires to receive display of the status of the download of the movie including a progress of the download, successful conclusion, and stopped;
    wherein the notification device to receive display of the status of the download of the movie is initially the user device, and the user configures the notification application to change the display of the status of the download of the movie from the user device initially used to a new notification device.

12. The system as claimed in claim 11 further comprising a notification server coupled to the network, the notification server having the notification preferences for notifying the presentation device of the status of the download.

13. The system as claimed in claim 12 wherein the notification application is in communication with the notification server to receive the notification preferences from the notification server.

14. The system as claimed in claim 11 wherein the download event is a successful download in an event of the successful download, an unsuccessful download in an event of the unsuccessful download, and a partial download in an event of the partial download.

15. A computer program product, tangibly embodied on a non-transitory computer readable storage medium, for providing download notification services, the computer program product including instructions for causing a computer to execute a method, comprising:
- identifying a presentation device for receiving download of a movie;
- identifying the presentation device for receiving a download notification related to the download of the movie;
- monitoring a downloading process of the download of the movie;
- sending the download notification to the presentation device in response to a download event on the presentation device for receiving the download of the movie;
- before the downloading process is complete, sending to the presentation device an alert in a notification message for display to a user on a display of the presentation device, in which the notification message indicates that the download of the movie will be viewable on the presentation device when a certain buffer is attained prior to completion of the download of the movie; and
- during the downloading process, receiving an alert in another message for display in a notification window on the display of the presentation device, in which the another notification message asks on the display of the presentation device whether the user desires to change notification preferences at that point for notifying the user about the status of the download of the movie;
- the notification preferences being an identification of a notification device upon which the user desires to receive display of the status of the download of the movie including a progress of the download, successful completion, and stopped;
- wherein the notification device to receive display of the status of the download of the movie is initially the presentation device, and the user configures the notification application to change the display of the status of the download of the movie from the presentation device initially used to a new notification device.

* * * * *